United States Patent

[11] 3,591,205

| [72] | Inventor | Jacob J. Hamburg |
| | | 2003 West Eight Mile Road, Detroit, Mich. 48203 |
| [21] | Appl. No. | 885,689 |
| [22] | Filed | Dec. 17, 1969 |
| [45] | Patented | July 6, 1971 |

[54] TUBE COUPLING
4 Claims, No Drawings

[52] U.S. Cl................................................. 285/81, 285/93, 285/111, 285/340
[51] Int. Cl................................................. F16l 17/02
[50] Field of Search.................................... 285/340, 111, 81, 92, 93

[56] References Cited
UNITED STATES PATENTS

| 2,491,004 | 12/1949 | Graham........................ | 285/340 X |
| 2,728,895 | 12/1955 | Quackenbush et al. ...... | 285/81 X |
| 3,291,510 | 12/1966 | Kody............................ | 285/340 |
| 3,312,483 | 4/1967 | Leadbetter et al............ | 285/340 |
| 3,362,729 | 1/1968 | Hendriks...................... | 285/340 X |
| 3,429,596 | 2/1969 | Marshall....................... | 285/340 |

FOREIGN PATENTS

| 1,221,842 | 9/1962 | France......................... | 285/81 |
| 1,554,624 | 12/1968 | France......................... | 285/340 |

*Primary Examiner*—Thomas F. Callaghan
*Attorney*—Cullen, Settle, Sloman & Cantor ABSTRACT: A slip-in-type tube coupling formed of a body having a central bore whose forward end is enlarged, a centrally apertured cap fastened upon the forward end of the body, a springy grab ring having an outer flat edge portion squeezed against the body forward end by the cap, and an inner frustoconical-shaped tube-gripping portion. A U-shaped resilient sealing ring with a corresponding frustoconically shaped base receives the gripping portion in face-to-face contact, with its outer leg sealing against the wall of the enlarged portion of the bore and its inner leg sealing against the tube.

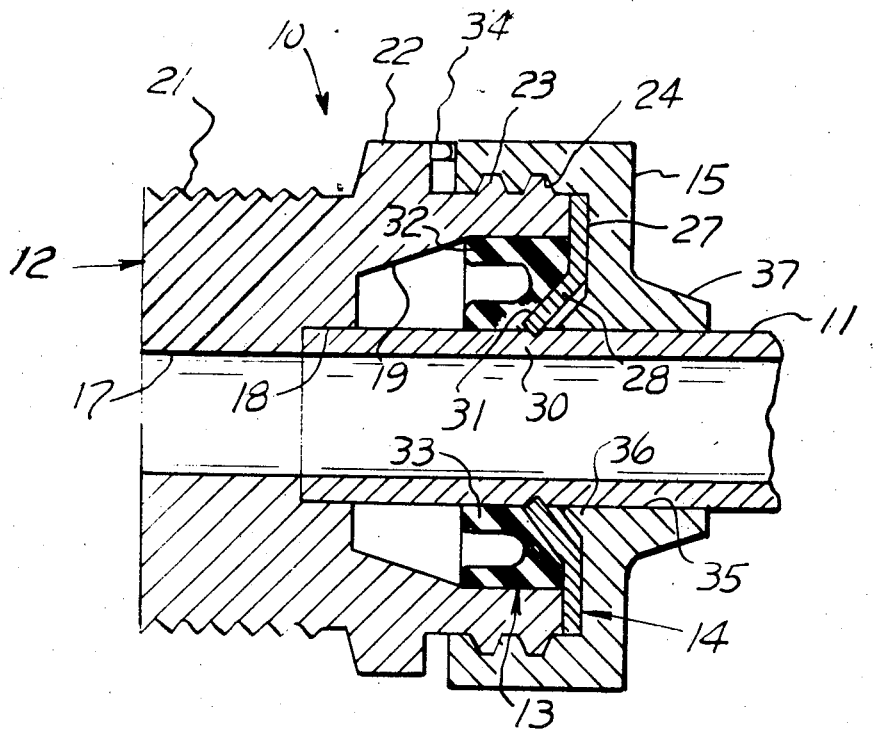

INVENTOR
JACOB J. HAMBURG
BY Cullen, Settle, Sloman & Cantor
ATTORNEYS 3,591,205

TUBE COUPLING

BACKGROUND OF THE INVENTION

The invention herein relates to slip-in-type couplings for receiving and coupling a smooth, thin wall metal or plastic tube to some other type of fixture or pipe. Conventionally, this type of coupling has consisted of a centrally bored tube-receiving body containing a frustoconical-shaped springy grab ring whose inner, annular edge grips and bites into the outer wall of the tube.

Usually, such couplings have included an apertured cap, through which the tube is inserted to enter the body, with the cap functioning to hold the grab ring in position within the body as well as to apply an axial force for compressing suitable sealing rings against the outer wall of the tube for preventing fluid leakage through the coupling. In this type device, it was necessary to loosen the cap in order to expand or relax the sealing ring or rings for receiving the tube, after which the cap had to be tightened for compressing the sealing rings and causing the grab ring to grip the tube against withdrawal.

An example of this prior type of tube coupling is illustrated in U.S. Pat. No. 3,312,484 to Davenport, granted Apr. 4, 1967. In the coupling illustrated, for example, in said patent, it was necessary to tighten the cap sufficiently to tightly compress the sealing ring inwardly against the tube, after insertion of the tube, in order to prevent leakage of fluid through the coupling. In addition to forming a relatively inefficient or poor seal, generally unsuitable for high-pressure fluid flow, the inward compression of the sealing rings tended to buckle or bend inwardly the thin wall of the tube.

Thus, the invention herein relates to an improvement in slip-in tube couplings of the type illustrated for example in the foregoing patent.

SUMMARY OF THE INVENTION

The invention herein generally contemplates positioning a U-shaped sealing ring within an enlarged forward end portion of the coupling body bore, with the base of the ring being frustoconical in shape to mate with or correspond with the frustoconical shape of the grab ring which is received therein in face-to-face contact, with the outer leg of the sealing ring sealing against the wall defining the bore and the inner leg sealing against the tube received within the body bore. The end cap squeezes the grab ring against the end of the coupling body for frictionally holding it in place. Thus, the cap is not loosened at any time, even for insertion of the tube, but rather once assembled, prior to insertion of the tube remains static and is removed only for purposes of disengaging the tube from the coupling body. Under high-pressure force, the U-shaped sealing ring not only applies greater inward pressure to seal against the tube, but also forces the frustoconical-shaped grab ring into tighter engagement with the tube to prevent withdrawal thereof as well as fluid leakage around the outside of the tube.

The invention herein also contemplates the addition of an annular lip on the interior of the cap to serve as a stop means for preventing the frustoconical grab ring from bending reversely upon an outward withdrawal movement of the tube, thereby preventing tube withdrawal except when the cap is removed. In addition a cooperating latch means is provided on the cap and coupling body to signal against overtightening of the cap.

These and other objects and advantages of this invention will become apparent upon reading the following description, of which the attached drawings form a part.

DETAILED DESCRIPTION

Figure 3:
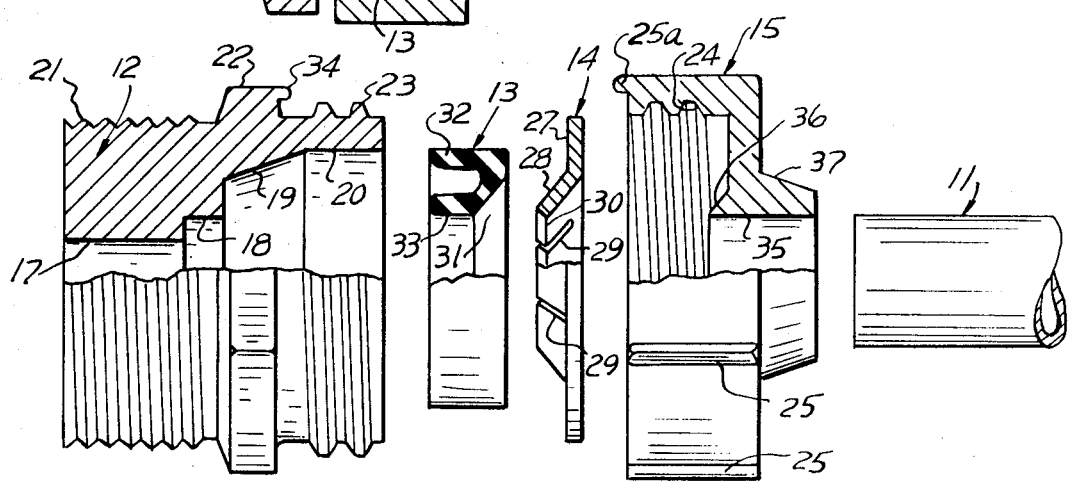
FIG. 3 is an elevational view, partially in cross section, of the various parts making up the coupling in disassembled relationship.

The tube coupling 10 is arranged to couple a thin-wall, smooth-surfaced, plastic or metal tube 11 to another tube or pipe or fitting (not shown). The coupling comprises four basic elements (see FIG. 3), namely, a centrally bored body 12, a U-shaped in cross section sealing ring 13, a thin springy sheet metal grab ring 14, and a cup-shaped cap 15.

The body 12 is provided with a stepped bore having a rear bore portion 17, which is approximately equal to the interior diameter of the tube 11, an intermediate bore portion 18, which forms a shoulder or stop for the tube end, an outwardly tapering bore portion 19, and a forward, enlarged bore portion 20.

The body 12 is generally cylindrical in shape with an outer rear threaded area 21 for threadedly coupling to a conventional fitting or pipe. The central portion of the body is formed as a wrench-gripping portion 22 and the forward end of the body is formed as a forward threaded portion 23 for threaded engagement with threads 24 formed within the cap 15.

The outer surface of the cap is formed with wrench-gripping beads 25 for grasping and twisting the cap upon the body for assembly.

The grab ring 14 is formed with an outer, flat, annular flange 27 which is squeezed between the forward end of the body and the base of the cap for holding the grab ring in position. The center of the grab ring is bent into a rearwardly extending, frustoconical portion 28 having radially extending slits 29 for increased flexibility. Its inner, annular edge defines a sharp tube-gripping edge 30.

The forwardly facing surface of the base of the sealing ring is formed into a corresponding or mating frustoconical portion 31 which receives the grab ring frustoconical portion in face-to-face contact. The outer leg 32 of the sealing ring is arranged in face-to-face contact with the wall defining the enlarged bore portion 20 and the inner leg 33 is arranged to contact the tube 11 in face-to-face relationship.

Figure 1:
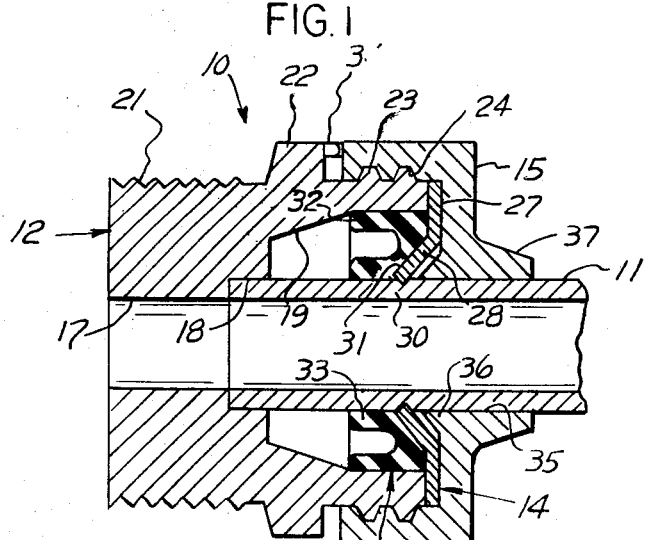
FIG. 1 illustrates a cross-sectional, elevational view of the tube coupling herein with the end of the tube positioned within the coupling.
Figure 2:
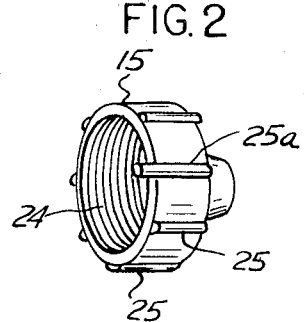
FIG. 2 is a reduced scale, perspective view of the cap, per se.

The four basic parts making up the coupling are assembled together, as shown in FIG. 1, with the cap 15 tightened upon the body for holding the grab ring in position.

Figure 4:
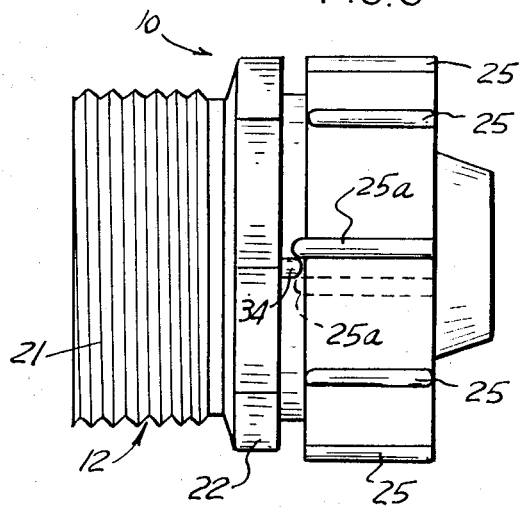
FIG. 4 is a plan view of the assembled coupling.

To prevent overtightening of the cap, one of the beads 25a is enlarged to extend rearwardly a short distance and interfere with or bump against a short, forwardly extending projection 34 formed integral with the body portion 22 (see FIG. 4), when the cap is almost, but not completely, tightened. A further twist on the cap causes the projection and bead extension to resiliently spring away from each other slightly, enough to cause them to pass from the dotted line position to the solid-line position shown in FIG. 4, where the cap is fully tightened. As they pass each other, an audible click occurs which signals that the cap is fully tightened. This prevents stripping the threads of the cap and body, which are preferably formed of a slightly resilient plastic material.

In use, the tube 11 is slipped through the central aperture 35 in the cap 15, through the grab ring 14 and seal 13, until its end bottoms in the intermediate bore portion 18. In this position, the annular grab ring-gripping edge 30 grips against and bites into the tube to prevent withdrawal, which can be accomplished only by removing the cap 15 for disengaging the grab ring from the tube.

Once the tube is inserted in the coupling, fluid leaking into the enlarged bore portion of the body causes the legs of the seal to separate so that the outer leg presses even more tightly against the bore wall and the inner leg presses even more tightly against the tube, thereby increasing the sealing force in response to any increase in pressure of the fluid attempting to leak around the tube.

In addition, the base of the seal applies a pressure, in response to fluid, against the frustoconical portion of the grab ring, thereby increasing its force of gripping against the tube and increasing it in response to increased fluid pressure. As can be seen, the greater the pressure of the fluid, the greater the sealing and gripping of the tube against withdrawal.

In order to prevent accidental withdrawal of the tube 11, such as due to an outwardly directed force applied to the tube, wherein tube withdrawal movement has a tendency to cause the grab ring frustoconical portion to bend reversely, a stop or antireversing annular lip 36 is formed around the opening 35 on the interior of the cap. The lip is normally spaced from the grab ring as shown in FIG. 1. However, as the grab ring buckles or tends to bend reversely due to a pull on the tube, it contacts the lip 36 which stops it against any further buckling or reversing, thereby preventing withdrawal of the tube.

An outer, annular flange 37 surrounding the outer end of the cap opening 35 increases the support and positioning of the tube 11 within the coupling.

Having fully described an operative embodiment of this invention, I now claim:

1. A tube coupling comprising a centrally bored body having a rear end and a forward end into which a tube may be received, with the forward end portion of the bore being of greater diameter than the rear end portion;
    a cup-shaped cap removably fastened to the forward end portion of the body and having a centrally apertured base covering the body forward end;
    a grab ring formed of thin springy sheet metal shaped as a flat outer flange, frictionally squeezed and held between the cap base and body forward end, and with an integral, central frustoconical rearwardly extending portion whose inner free edge defines an annular tube-gripping edge;
    a U-shaped in cross section resilient sealing ring having an outer leg in face-to-face contact with the wall defining the bore forward end portion, an inner leg normally arranged in face-to-face contact with the tube, and a base having its forward face formed in a frustoconical shape corresponding to and receiving in face-to-face contact the grab ring frustoconical portion, and with the sealing ring being axially shorter than the axial length of the bore forward end portion;
    whereby a tube may be slipped through the cap base aperture, grab ring and sealing ring to the bore rear end portion for being gripped by said grab ring-gripping edge, and so that fluid pressure caused by fluid entering the bore forward end portion forces the sealing ring tube-contacting leg into tighter contact with the tube, and forces the sealing ring base to press the grab ring frustoconical portion towards the tube wherein its annular gripping edge more tightly grips the tube.

2. A tube coupling as defined in claim 1, and including a rearwardly extending annular lip formed on the rear surface of the cap base around the central aperture thereof;
    said lip being normally spaced a short distance forwardly of the adjacent grab ring frustoconical portion, for stopping and holding said frustoconical portion against bending and inverting forwardly when the tube is axially withdrawn forwardly of the body, thereby preventing tube withdrawal 3. A tube coupling as defined in claim 2 and said body forward and rear bore portions joining at an intermediate, annular shoulder-forming bore portion of a size to receive and stop the rear end of the tube, with the bore rear portion being approximately equal to the tube inner diameter to generally form an extension thereof.

4. A tube coupling as defined in claim 1 and said cap being threadedly connected to said body;
    said cap having a short rearwardly directed bead portion arranged in the path of a short forwardly directed projection formed on the body for interference contact therewith when the cap is almost tightened upon the body, and said projection and bead portion being resiliently movable relative to each other, for forcing one past the other to the final tightened position of the cap relative to the body, and thereby producing an audible sound as they pass each other signalling signalling the final tightened position of the cap.